(12) United States Patent
Chang (10) Patent No.: US 9,436,862 B2
(45) Date of Patent: Sep. 6, 2016

(54) ELECTRONIC APPARATUS WITH SEGMENTED GUIDING FUNCTION AND SMALL-WIDTH BIOMETRICS SENSOR, AND GUIDING METHOD THEREOF

(71) Applicant: Mei-Yen Lee, Hsin Chu (TW)

(72) Inventor: Jer-Wei Chang, Hsinchu (TW)

(73) Assignee: J-METRICS TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 14/535,193

(22) Filed: Nov. 6, 2014

(65) Prior Publication Data

US 2015/0131876 A1    May 14, 2015

(30) Foreign Application Priority Data

Nov. 12, 2013    (TW) .............................. 102140970 A (51) Int. Cl.
  *G06K 9/00*  (2006.01)
  *G06F 3/0488*  (2013.01)
(52) U.S. Cl.
  CPC ......... *G06K 9/00013* (2013.01); *G06F 3/0488* (2013.01); *G06K 9/00026* (2013.01); *G06K 9/00912* (2013.01); *G06F 2203/0338* (2013.01)
(58) Field of Classification Search
  None
  See application file for complete search history.

(56) References Cited

U.S. PATENT DOCUMENTS

| 7,801,340 B2* | 9/2010 | Abiko | G06K 9/00026 382/124 |
| 2005/0105782 A1* | 5/2005 | Abiko | G06K 9/00026 382/124 |
| 2012/0269406 A1* | 10/2012 | Kraemer | G06K 9/00013 382/124 |

\* cited by examiner

*Primary Examiner* — Wesley Tucker
(74) *Attorney, Agent, or Firm* — Muncy, Geissler, Olds & Lowe, P.C.

(57) ABSTRACT

An electronic apparatus comprises a body, a human-machine interface device, a small-width biometrics sensor and a processing module. The human-machine interface device is disposed on the body. The small-width biometrics sensor is disposed on the body. The processing module, disposed on the body and electrically connected to the small-width biometrics sensor and the human-machine interface device, cooperates with the human-machine interface device and the small-width biometrics sensor to guide different physical portions of a finger of a user to directly contact or approach the small-width biometrics sensor according to indications of the human-machine interface device, so that the small-width biometrics sensor senses the finger to capture partial physical patterns of the finger. A guiding method of the electronic apparatus is also disclosed.

16 Claims, 10 Drawing Sheets

ELECTRONIC APPARATUS WITH SEGMENTED GUIDING FUNCTION AND SMALL-WIDTH BIOMETRICS SENSOR, AND GUIDING METHOD THEREOF

This application claims priority of No. 102140970 filed in Taiwan R.O.C. on Nov. 12, 2013 under 35 USC 119, the entire content of which is hereby incorporated by reference.

BACKGROUND OF THE INVENTION

1. Field of the Invention

The invention relates to an electronic apparatus and a guiding method thereof, and more particularly to an electronic apparatus with a segmented guiding function and a small-width biometrics sensor, and a guiding method thereof.

2. Related Art

An electronic apparatus having a biometrics sensor (e.g., a fingerprint sensor) can provide the fingerprint recognition function, and thus provide a more robust authentication method than the password protection for the information security. Thus, the electronic apparatus has the growing business opportunity in the market. More particularly, the mobile device/smart mobile phone has gradually represented the personal consumer platform, and the mobile payment, such as near field communication (NFC), constructed on the device also becomes the development trend.

In order to make the commercially financial behavior, constructed on the mobile device, become more secure, the authentication mechanism is unavoidable, and the best method is the biometrics authentication technology. The fingerprint sensor has become the optimum means based on the stability and uniqueness of the identification characteristics and the slim and small dimensional requirements of the biometrics sensor because the sensor needs to be integrated into the mobile device.

Due to the requirements on the outlook and the size of the mobile device, the fingerprint sensor suitable for the mobile device is not the full-width sensor (e.g., the sensor for collecting the criminal's fingerprint has the area of about 2.54 cm×2.54 cm). Thus, the small area-type sensor (having the area smaller than 1 cm×1 cm) and the sweep type sensor (having the width smaller than 1 cm) have become two possible choices. However, the common feature of all biometrics sensors is to have the lower false access rate (FAR) when the larger image is captured, and to have the lower false rejection rate (FRR) when used by himself/herself. Thus, the small-area and small-width sensors contravene the low FAR/FRR.

The invention is provided to solve the problem of the too high FAR/FRR induced by the utilization of the small area-type sensor and the small-width sweep-type sensor.

SUMMARY OF THE INVENTION

It is therefore an object of the invention to provide an electronic apparatus having a segmented guiding function and a small-width biometrics sensor to provide the user the segmented guiding function and facilitate the enrolling operation of the fingerprint.

To achieve the above-identified object, the invention provides an electronic apparatus comprising a body, a human-machine interface device disposed on the body, a small-width biometrics sensor disposed on the body, and a processing module. The processing module is disposed on the body, is electrically connected to the small-width biometrics sensor and the human-machine interface device, and cooperates with the human-machine interface device and the small-width biometrics sensor to utilize the human-machine interface device to guide different physical portions of a finger of a user to directly contact or approach the small-width biometrics sensor according to indications of the human-machine interface device, so that the small-width biometrics sensor senses the finger to capture partial physical patterns of the finger.

The invention also provides an electronic apparatus comprising a processing module, a human-machine interface device and a small-width biometrics sensor. The human-machine interface device is electrically connected to the processing module. The small-width biometrics sensor is electrically connected to the processing module. The processing module executes a positioning algorithm and cooperates with the human-machine interface device to utilize the human-machine interface device to provide a human-machine interface to provide an initial intelligent guide to guide different physical portions of a finger of a user to directly contact or approach the small-width biometrics sensor, so that the small-width biometrics sensor senses the finger to capture partial physical patterns of the finger.

The invention further provides a guiding method of an electronic apparatus with a segmented guiding function, the electronic apparatus comprising a human-machine interface device and a biometrics sensor, the guiding method comprising the steps of: utilizing the biometrics sensor to capture a first partial physical pattern of a finger; utilizing a positioning algorithm to calculate a geometric position of the finger according to the first partial physical pattern; and performing a subsequent intelligent guide according to the geometric position of the finger to utilize the biometrics sensor to capture a second partial physical pattern of the finger.

According to the electronic apparatus with the segmented guiding function and the small-width biometrics sensor and the guiding method thereof, it is possible to utilize a small-area small-width biometrics sensor to work in conjunction with the human-oriented segmented guiding so as to keep the beauty of the electronic apparatus and enable the user to perform the biometrics characteristic authentication to protect the data and the access right of the electronic apparatus.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

The main feature of the invention is to combine a small area-type sensor/small-width sweep-type sensor (hereinafter referred to as a small-width sensor) with a positioning algorithm, and to utilize a processing module of a mobile device, which usually comprises a central processing unit (CPU) and the desired computation memory and storage memory, to execute the positioning algorithm, which is usually stored in the storage memory in advance. In addition, an intelligent guide and a human-machine interface displayed on a screen are utilized to achieve the desired function, the intelligent guide is to utilize the computation result of the positioning algorithm to guide the user to place different physical portions of a finger (or other biometrics portions, such as the palm, eye and the like) according to the indications (e.g., the screen indications or sound indications) to approach the small-width biometrics sensor according to different virtual portion indications, defined on the human-machine interface on the screen. Thus, the small-width biometrics sensor senses different physical portions of the finger to capture partial physical patterns with overlaps or without overlaps. Because the conventional area-type fingerprint sensor has the issues of large area and high cost and affects the outlook of the electronic apparatus, using the small-width sensor and the method of the invention can completely solve this problem and obtain the FAR/FRR quality the same as that of the large-width sensor, so that the user can use the fingerprint authentication function more conveniently and instinctively.

Figure 1:
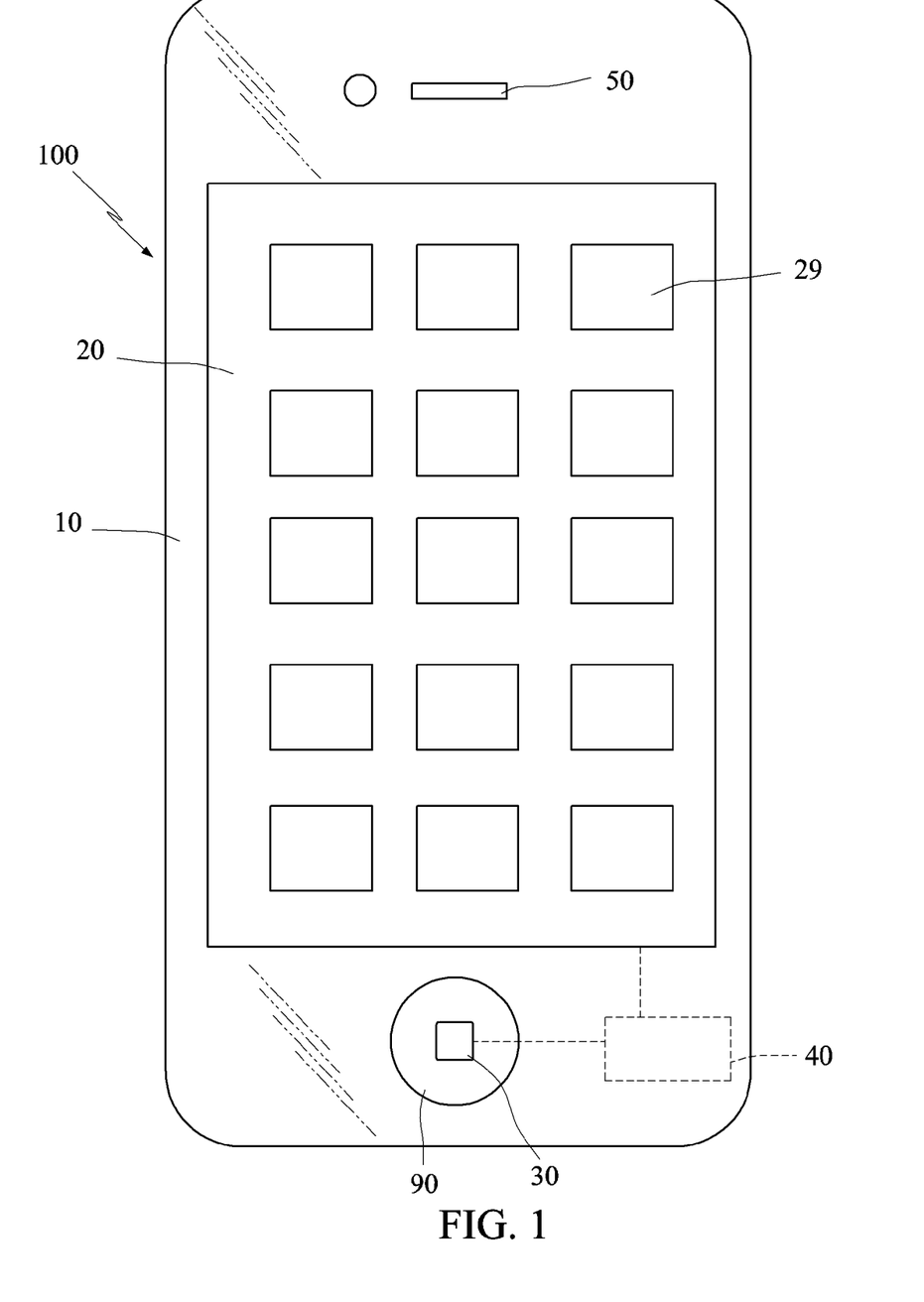
FIG. 1 is a schematic view showing an electronic apparatus according to a first embodiment of the invention.

FIG. 1 is a schematic view showing an electronic apparatus 100 according to a first embodiment of the invention. In this embodiment, a mobile device serves as a non-restrictive example for the illustrative purpose, wherein the mobile device comprises a mobile phone, a tablet computer, a personal digital assistant or the like. In other embodiments, the electronic apparatus may also be a notebook computer, an entrance security control apparatus or the like. As shown in FIG. 1, the electronic apparatus 100 comprises a body 10, a display 20 functioning as a human-machine interface device, a small-width biometrics sensor 30 and a processing module 40.

The display 20 pertaining to the human-machine interface device is disposed on the body 10. In another embodiment, a sound output device, such as a speaker, may function as the human-machine interface to achieve the effect of the invention by way of intelligent acoustic guide. The small-width biometrics sensor 30 is disposed on the body 10, and is disposed beside the display 20 in this embodiment. Alternatively and strictly speaking, the small-width biometrics sensor 30 is disposed beside an effective region of the display 20 capable of displaying images. The processing module 40 is disposed on the body 10 and electrically connected to the small-width biometrics sensor 30 and the display 20. When the electronic apparatus 100 is turned on, the display 20 can display a touch application icon 29 for the user to execute the touch operation. The small-width biometrics sensor 30 may sense the fingerprint or the subcutaneous characteristics or even the vein pattern of the finger. Of course, the concept of the invention may also be applied to other types of biometrics sensors. Meanwhile, the position of the biometrics sensor is not restricted to the lateral side of the display, and the biometrics sensor may also be disposed on a lateral side or back side of the body or any location of the body.

Figure 2:
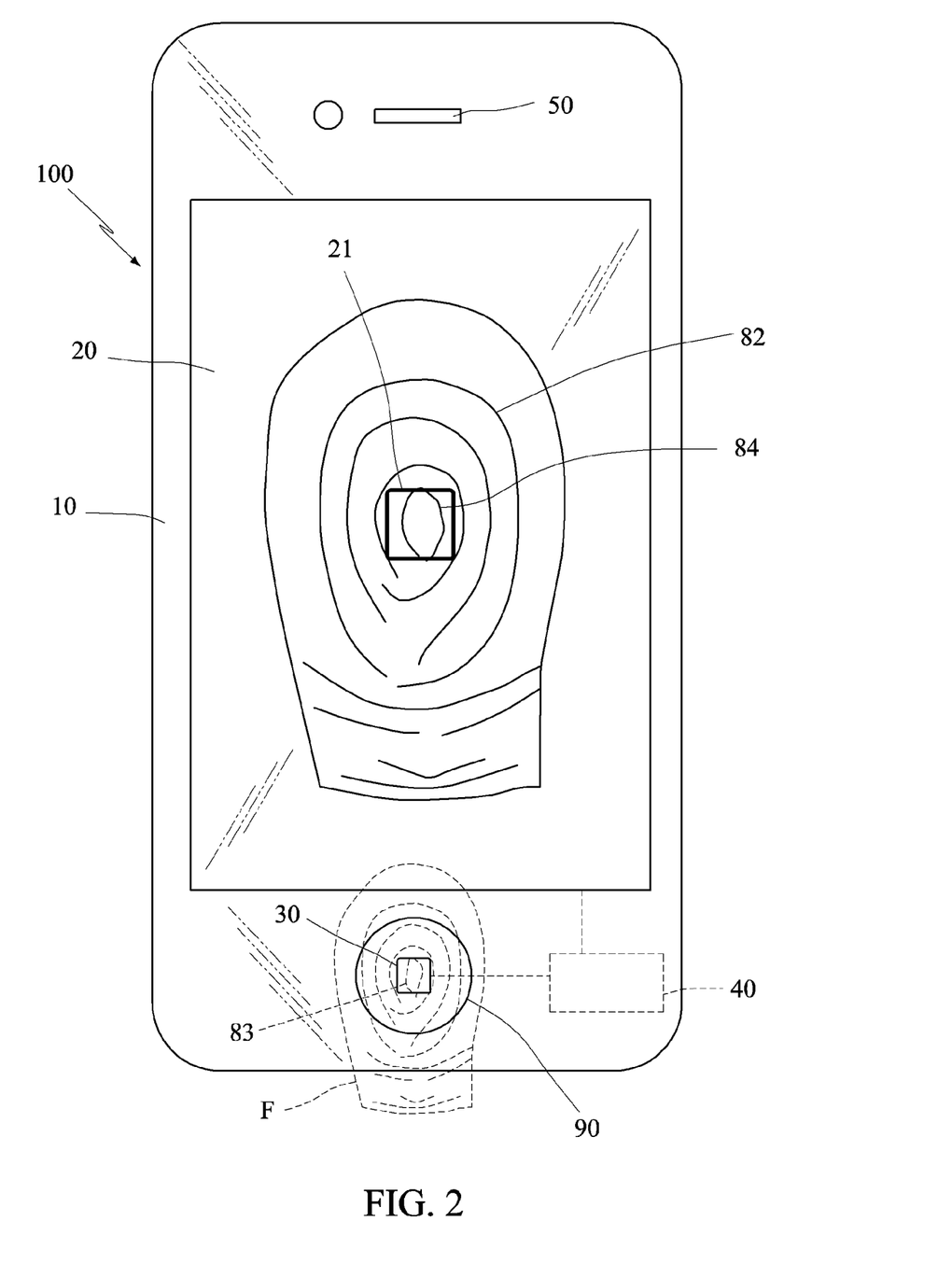
FIG. 2 is a schematic view showing the electronic apparatus of FIG. 1 at a moment of fingerprint enrolling.
Figure 3:
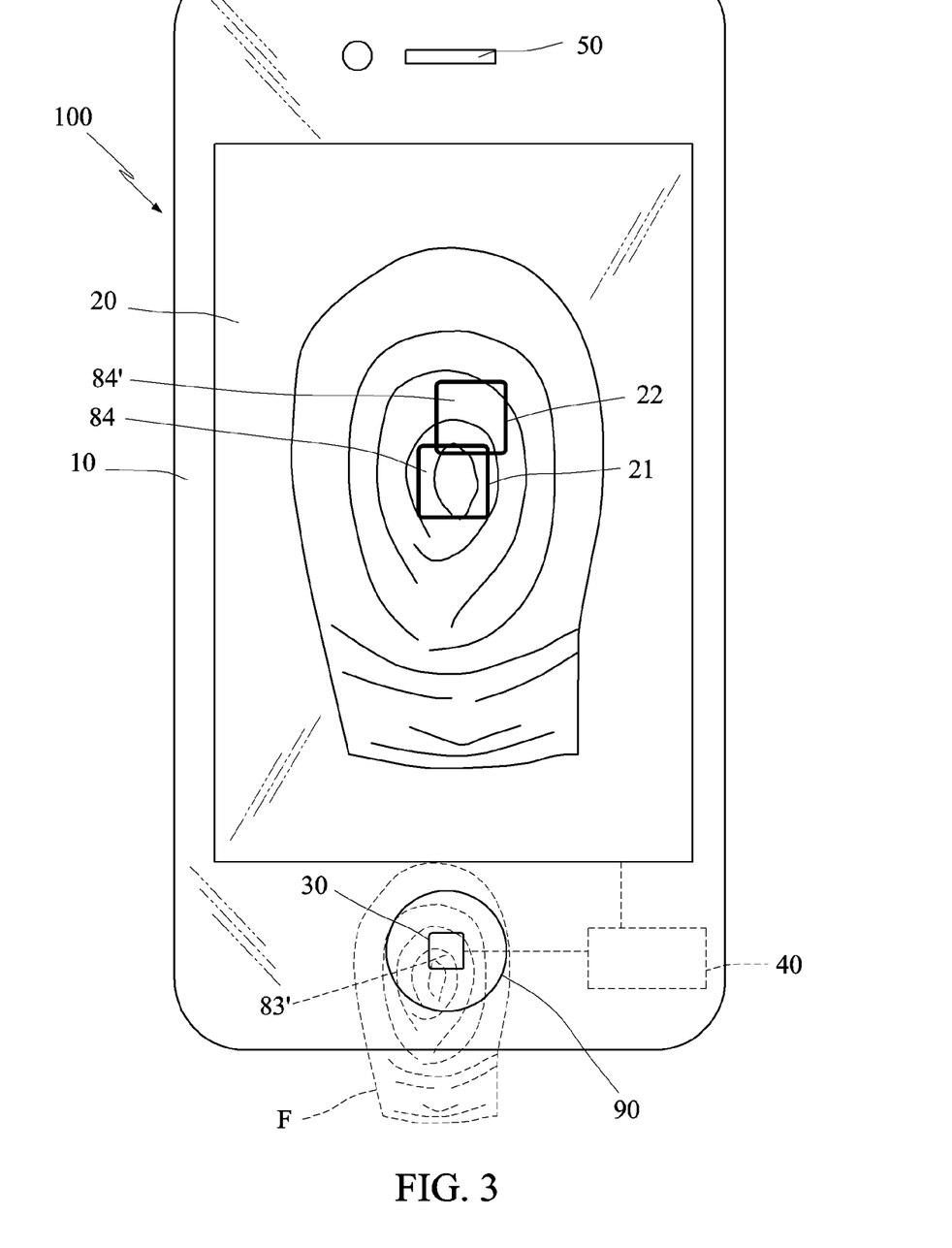
FIG. 3 is a schematic view showing the electronic apparatus of FIG. 1 at another moment of fingerprint enrolling.

The first step of the invention is to construct a human-machine interface on the display. In this embodiment, the human-machine interface comprises, without limitation to, a virtual fingerprint image. Of course, if the biometrics sensor is changed, the virtual fingerprint image is also correspondingly modified into the virtual images corresponding to different biometrics portions. The virtual fingerprint image has a certain percentage of finger size and fingerprint textures. Of course, the invention is not restricted thereto. A true finger image may also be displayed by a real photograph, or the finger's outlook is the true photo but the fingerprint is drawn. Despite this, all the fingerprint images on the display are referred to as a virtual finger and a virtual fingerprint. FIG. 2 is a schematic view showing the electronic apparatus 100 of FIG. 1 at a moment of fingerprint enrolling. FIG. 3 is a schematic view showing the electronic apparatus 100 of FIG. 1 at another moment of fingerprint enrolling. As shown in FIGS. 1 to 3, the processing module 40, executing a positioning algorithm, cooperates with the display 20 and the small-width biometrics sensor 30 to detect a geometric position, where a small portion of a contact finger F (corresponding to the effective area of the small-width sensor) is located inside the full finger area, to establish an intelligent guiding method. In this embodiment, the intelligent guiding method guides a user to "approach" different physical portions of the finger F to the small-width biometrics sensor 30 according to the shown image or text indications (i.e., the indications of the human-machine interface) on the display 20, so that the small-width biometrics sensor 30 senses the finger F to capture multiple partial physical patterns 83. The so-called "approach" comprises, without limitation to, the sequentially direct contact or the sequentially indirect contact through the air gap. In this example, the small-width biometrics sensor 30 is disposed on the home key 90 of the mobile phone. The user can press the home key 90 to perform the fingerprint enrollment or recognition operation.

Because the area of the small-width biometrics sensor 30 is small, the complete fingerprint pattern of the user cannot be obtained at a time, and only one partial physical pattern 83 can be obtained at a time. If only one partial physical pattern 83 is stored in the electronic apparatus 100, the recognition qualities, such as the false rejection rate (FRR) and the false access rate (FAR), are affected. In one example, the effective sensing area of the small-width biometrics sensor is, but not limited to, smaller than 8 mm*8 mm, is preferably equal to 7 mm*7 mm, and more preferably equal to 6 mm*6 mm. In another example, the effective sensing area equal to 5 mm*5 mm may be used; a rectangular sensing area, such as 8 mm*6 mm or 8 mm*4 mm, may be used; or a sweep type sensor having the width ranging from 6 to 8 mm may be used.

Under the situation of the so small sensing area, if the user does not enlarge the enrolled physical pattern, the higher FAR/FRR is caused for the subsequent one-touch touch use (i.e., the finger only contacts the small area-type sensor once or only sweeps across the small-width sweep-type sensor once, hereinafter referred to as one-touch), and this significantly influences the user's desire for use. Thus, the most important topic is to enlarge the total area of the physical patterns stored in the electronics apparatus 100 by multi-touching enrollment, wherein the total area is equal to or slightly smaller than the product of the sensor area and the touching (or sweeping) counts upon enrollment. The object of the invention is to design an intelligent (smart) judging (also referred to as the positioning algorithm) and guiding method to enlarge the total enrollment area of the physical pattern and decrease the accumulated touching counts during the enrollment. Thus, the user can enroll the fingerprint on the small-width sensor more easily, and the enrolled database becomes more complete to facilitate the subsequent one-touch usage for identification and enhance the FAR/FRR.

In the enrolling mode, the human-machine interface device firstly provides a human-machine interface (i.e., displays a virtual fingerprint image, or guides the user by the text, image, sound or light contrast to place his/her finger on the sensor). Thus, the first partial physical pattern 83 is captured by the fingerprint sensor. After the first partial physical pattern 83 is obtained, the processing module executes the positioning algorithm to make the judgement according to the pattern flow of the first partial physical pattern. For example, the fingerprint is composed of fixed helical curves, and the fingerprint patterns of the helical curves have different curvature vectors and pattern densities at different physical portions. Therefore, the positioning algorithm can judge the geometric position of the captured first partial physical pattern 83 corresponding to the global physical pattern of the finger F, and can map the captured first partial physical pattern 83 to the virtual fingerprint image on the display, so that a virtual geometric position on the virtual fingerprint image is established, and an enrolled first partial virtual pattern 84 is displayed. For example, in FIG. 2, the center of the finger F of the user is just located around the center of the small-width biometrics sensor 30. So, the processing module 40 can determine the position of the user's finger F by judging the curvature vectors, pattern density and curvature of the texture of the helical shape of the finger, even by the patterns recognition according to the positioning algorithm, and the position can be displayed on the display 20, as shown by the rectangular frame 21 of FIG. 2. In another example, when the electronic apparatus allows the enrollments of multiple users, the virtual pattern of a new user may be different form the physical pattern of the fingerprint of the registered user to prevent the user, who finds the electronic apparatus, from stealing the fingerprint data. Next, after the processing module 40 executes the positioning algorithm and determines the geometric position, an intelligent guide is enabled to indirectly or directly guide the user to move his/her finger to the next position, shown in FIG. 3, according to the indication or indications of the human-machine interface. The detailed descriptions will be made in the following. The processing module 40 also determines the geometric position and displays, for example, the rectangular frame 22 of FIG. 3 on the display 20. Consequently, the user can perceive the moving direction of the finger. The direct guiding method comprises displaying an arrow directly on the display 20. For the indirect guiding method, only the rectangular frames 21 and 22 are displayed, and the user will know how to move his/her finger after seeing the rectangular frames 21 and 22. After the first partial virtual pattern 84 is displayed by the rectangular frame 21, the intelligent guide sets a second rectangular frame 22 displayed on the virtual fingerprint image (i.e., the human-machine interface), and uses the text, image, sound or the like to guide the user to place the finger on the sensor 30 at the position corresponding to the second rectangular frame 22, so that the sensor 30 captures a second partial physical patterns 83' of the finger. Then, the positioning algorithm is executed to identify the geometric position thereof to identify the validity of the second partial virtual pattern 84' in the second rectangular frame 22, and to complete the display or indication of the second partial virtual pattern 84' corresponding to the second partial physical patterns 83'.

As mentioned hereinabove, the positioning algorithm, the processing module 40 and the display 20 may cooperate with one another to display a global virtual pattern (human-machine interface) 82 on the display 20. The global virtual pattern is a fingerprint pattern of an ordinary finger and preferably but non-limitatively cover the finger profile to provide the orientation sense to the user. Next, the processing module 40 cooperates with the display 20 to calculate the position of each partial physical pattern 83 corresponding to the global virtual pattern 82, and to display a partial virtual pattern 84, corresponding to each partial physical pattern 83, on the display 20 to guide the user. The virtual area of the partial virtual pattern 84 is depicted by the rectangular frame 21. The partial physical pattern 83 is depicted by the physical area of the small-width biometrics sensor 30. The partial virtual patterns 84 may be sequentially displayed on the display 20 with different states, so that the user obtains the positions of the partial physical patterns 83. For example, the processing module 40 cooperates with the display 20 to display one portion of the partial virtual patterns 84 according to the position, where the user places the finger, by way of filling-coloring or clearing-wiping to correspondingly show one sensed portion of the partial physical patterns 83. Alternatively, a portion of the partial virtual patterns, which has been successfully enrolled, is shown by the highlighted color (e.g., red), and the other portions of the partial virtual patterns are depicted by the lighter color (e.g., light gray). The filling-coloring and clearing-wiping methods comprise, without limitation to, highlight display, blinking foreground or background display, moving boarder, neon light or the like, to enhance the contrast between the foreground and the background to achieve the guiding function. In order to determine the position, the processing module 40 can determine the position of the partial physical pattern 83 according to the curvature of the texture of each partial physical pattern 83.

Furthermore, the electronic apparatus 100 may further comprise a sound triggering module 50, which is implemented by a speaker, for example. The sound triggering module 50 also pertains to the human-machine interface device to replace the display to provide the guiding function. The sound triggering module 50 is disposed on the body 10 and electrically connected to the processing module 40, and outputs directional sound commands to guide (functioning independently) or auxiliarily guide (functioning in conjunction with the display) the user's finger to move. For example, the user's finger is guided to move upwards, downwards, leftwards or rightwards to a predetermined position.

Figure 4:
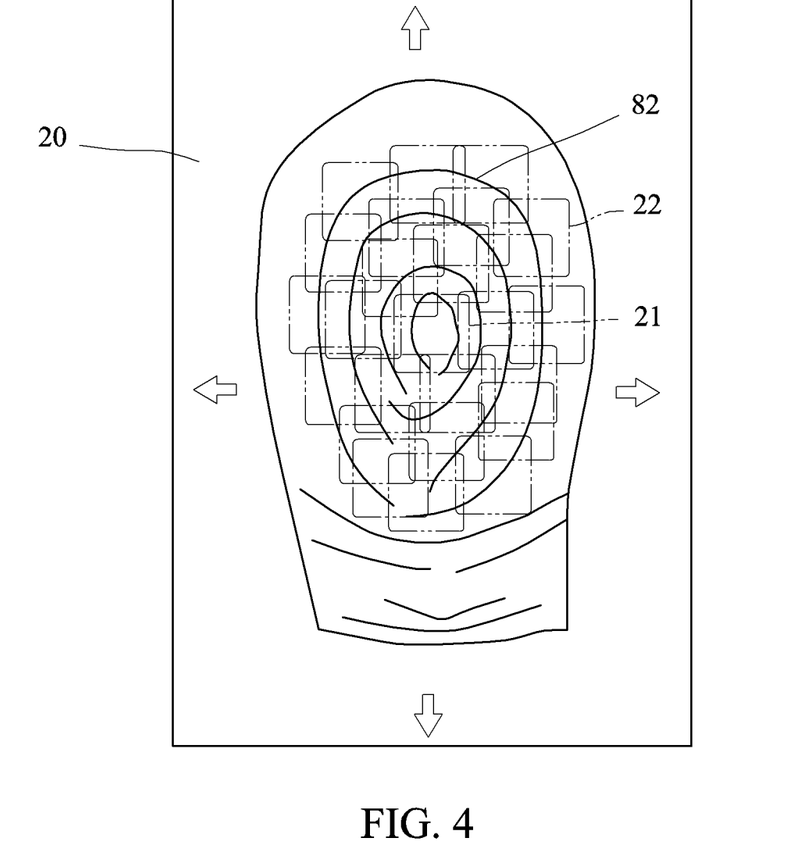
FIG. 4 is a schematic view showing a segmented guiding method on a display of the electronic apparatus of FIG. 1.
Figure 5:
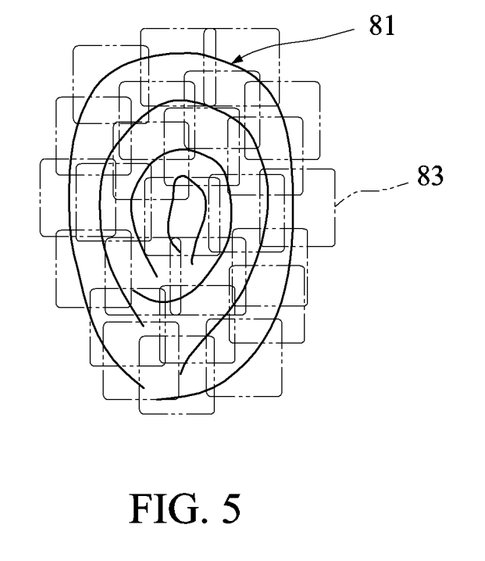
FIG. 5 is a schematic view showing partial physical patterns.
Figure 6:
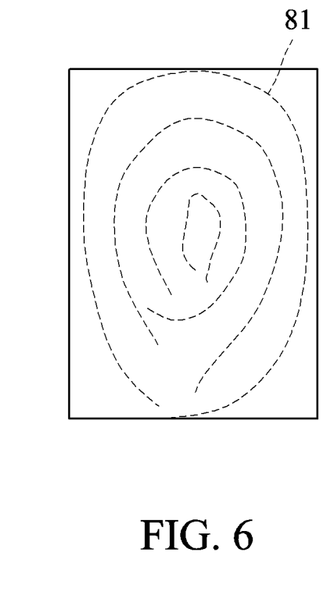
FIG. 6 is a schematic view showing a global physical pattern.

FIG. 4 is a schematic view showing a segmented guiding method on the display 20 of the electronic apparatus 100 of FIG. 1. FIG. 5 is a schematic view showing the partial physical patterns 83. FIG. 6 is a schematic view showing a global physical pattern 81. As shown in FIGS. 4 to 6, the partial physical patterns 83 comprise first to N-th partial physical patterns 83 according to the sensing order, the partial virtual patterns 84 comprise first to N-th partial virtual patterns 84 according to the sensing order, and the processing module 40 cooperates with the display 20 to firstly display the first partial virtual pattern 84, and displays second to N-th partial virtual patterns 84 to guide the user according to the position or positions of one or both of the first partial physical pattern 83 and the first partial virtual pattern 84, where N is a positive integer greater than 1. For example, in FIGS. 8 to 10 to be described later, N is equal to 9. It is to be noted that detailed textures of the global physical pattern 81 and the global virtual pattern 82 are not necessarily the same because the global virtual pattern 82 is only used to provide the guiding function for the relative movement.

It is to be noted that the positioning algorithm may further comprise utilizing the processing module 40 to form the global physical pattern 81 by way of logic assembling a plurality of partial physical patterns 83, wherein the pattern area of the global physical pattern 81 is greater than the sensing area of the small-width biometrics sensor 30. The global physical pattern 81 serves as the biometrics database for enrollment or registering. Upon a next usage, the user only has to place the finger in contact with or close to the small-width biometrics sensor 30 once, so that the partial pattern can be compared with the global physical pattern 81. Thus, after the user finishes the enrollment, there is no need for the multiple-touching identification operation that can hinder the long-term using desire for the user. Of course, the intelligent guide may be used to guide the user limitatively or non-limitatively to move the finger on or over the small-width sensor, wherein the limitative guiding represents a predetermined direction or speed, while the non-limitative guiding represents the free movement. Such non-one-time identification touches can enhance the authentication precision and prevent the misjudgment from being made.

Figure 7:
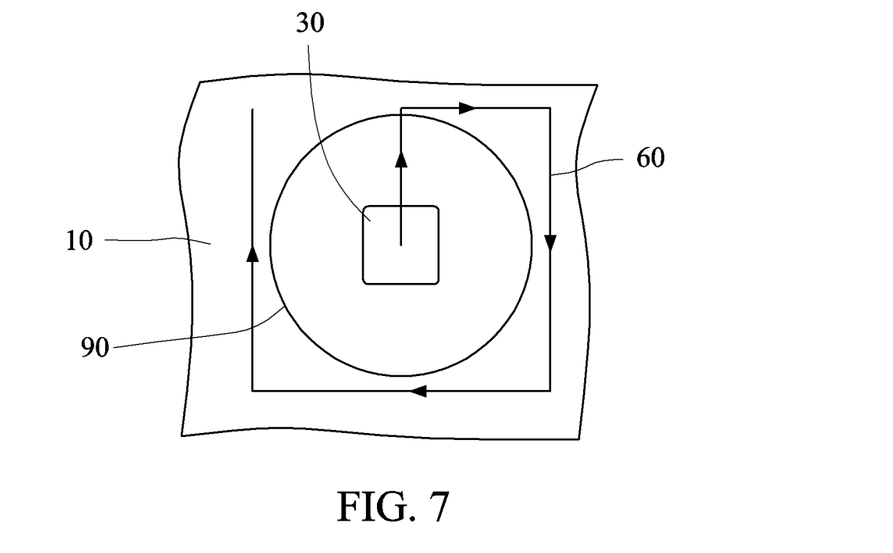
FIG. 7 is a schematic view showing a physical indicating pattern.

FIG. 7 is a schematic view showing a physical indicating pattern. As shown in FIG. 7, the electronic apparatus 100 may further comprise a physical indicating pattern 60, which is formed on the body 10 and disposed adjacent to the small-width biometrics sensor 30, and provides the direction indicating guides.

Figure 8:
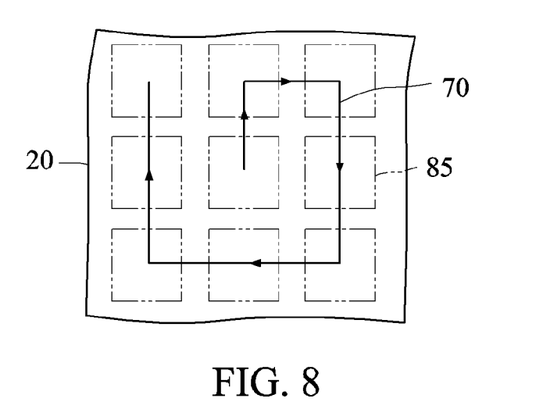
FIGS. 8 to 10 show three non-restrictive examples of the segmented guiding method.
Figure 9:
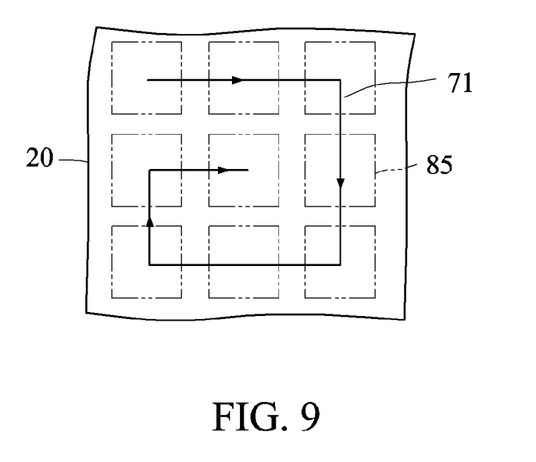
Figure 10:
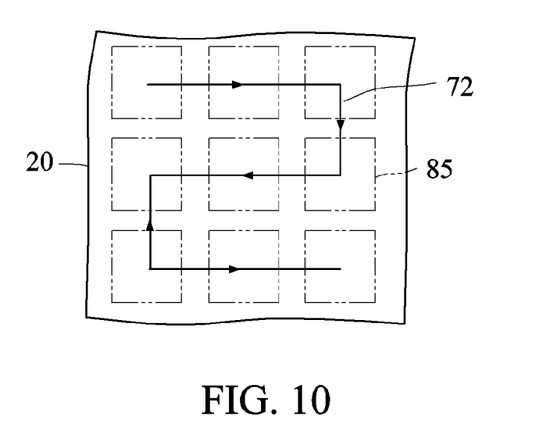

FIGS. 8 to 10 show three non-restrictive examples of the segmented guiding method. As shown in FIG. 8, the processing module 40 cooperates with the display 20 to display a virtual indicating pattern 70, corresponding to the physical indicating pattern 60, on the display 20 to achieve a guiding function. It is to be noted that the block 85 of FIG. 7 corresponds to one portion of the partial virtual pattern 84 but not all of the partial virtual patterns 84, and is mainly used to show the center position of the partial virtual pattern 84. FIGS. 9 and 10 show another two virtual indicating patterns 71 and 72. When the processing module 40 judges that the first sensing position is just located at the upper left corner, the directional guide of FIG. 9 or 10 may be performed. Analogically, when the processing module 40 judges that the first sensing position is not located at the center position, the segmented guiding, the detailed description of which will be omitted, may be performed according to the similar virtual indicating pattern or the guiding path thereof.

If only the small-width biometrics sensor is used without the assistance of the segmented guiding function of the invention, then the user may spend a lot of time to perform the try-and-error, which does not satisfy the human-oriented design.

Figure 11:
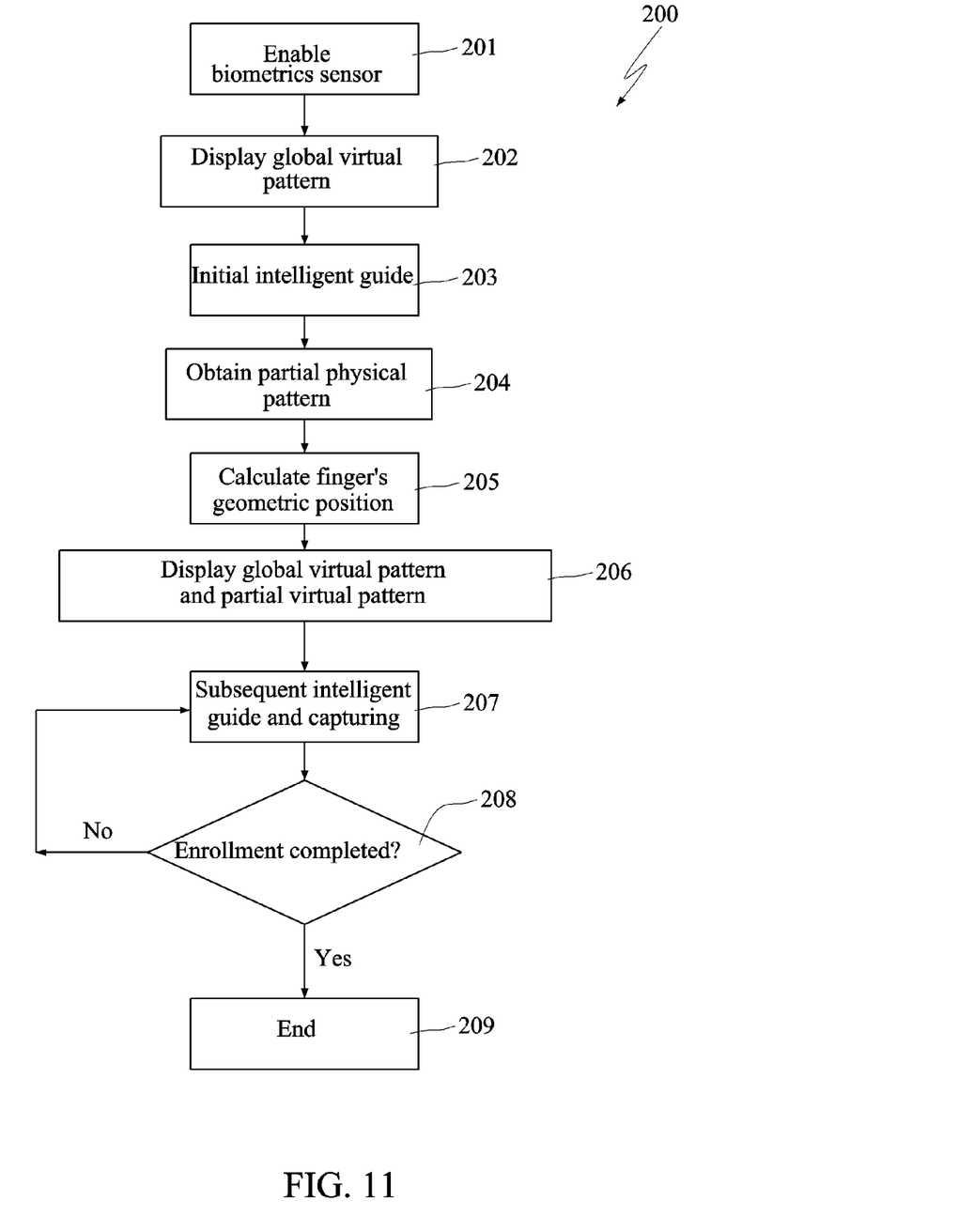
FIG. 11 is a schematic view showing an operation flow of the electronic apparatus according to the first embodiment of the invention.

FIG. 11 is a schematic view showing an operation flow 200 of the electronic apparatus according to the first embodiment of the invention. Please refer to FIGS. 11, and 2 to 4. Firstly, in step 201, when the user wants to turn on or wake up the electronic apparatus, the biometrics sensor is enabled by software or firmware or hardware to enter an enrolling mode. Then, in step 202, the global virtual pattern, such as a drawn finger pattern, a simple fingerprint pattern or a finger vein pattern, is displayed on the display 20. Next, in step 203, the initial intelligent guide is performed using the human-machine interface (display) 20 to guide the user to place different physical portions of his/her finger to directly contact or approach the specific position of the biometrics sensor device by texts, sound or motion pictures. For example, the center of the finger may be guided to align with the biometrics sensor. Of course, one end of the finger may be guided to align with the biometrics sensor. It is to be noted that the step 203 may be omitted in another embodiment. That is, the initial intelligent guide is not performed so that the user can freely place his/her finger. Alternatively, either the global virtual pattern displayed on the display or indications of "Please place the finger" provided by the speaker can be regarded as the initial intelligent guide. Then, in step 204, the biometrics sensor 30 performs sensing to obtain the partial physical pattern (i.e., the first partial physical pattern). Next, in step 205, the processing module 40 executes the positioning algorithm to perform calculation according to the first fragment fingerprint pattern to obtain the geometric position of the finger. Then, in step 206, a virtual geometric position is established, and the processing module 40 cooperates with the display 20 to display the global virtual pattern and the first partial virtual pattern corresponding to the partial physical patterns. For example, by analyzing the patterns flow of the finger's fingerprint texture, the geometric position of the first fragment fingerprint pattern corresponding to the true finger can be determined, so that the corresponding geometric position can be displayed on the virtual fingerprint pattern of the display. The display method can be achieved by means of the image contrast, color, flicker or the like.

Next, in step 207, the subsequent intelligent guide and capturing processes are performed, and the procedure starts from the displaying of the first virtual pattern (partial virtual pattern) at the corresponding geometric position on the fingerprint pattern of the display. A position of the second virtual pattern (partial virtual pattern) is displayed to guide the user to move his/her finger to enroll the second fragment fingerprint pattern (partial physical pattern). Then, in step 208, the processing module 40 executes the positioning algorithm to judge whether the physical geometric relationship between the obtained second partial physical pattern and the first partial physical pattern is the same as or similar to the virtual geometric relationship between the second partial virtual pattern and the first partial virtual pattern to verify whether the enrollment of the second partial physical patterns (that is, to judge whether the second partial physical pattern is valid according to the subsequent intelligent guide, which means whether the user moves his/her finger according to the subsequent guide or guides) is completed and whether the enrollment of the predetermined number of partial physical patterns is completed. This predetermined region can be adjusted according to the statistics or experience values. If the judged result of the step 208 is negative, then the process returns to the step 207 to continue to perform the intelligent guiding and pattern capturing. If the judged result of the step 208 is affirmative, then the steps 207 and 208 are repeated to sequentially display the third partial virtual pattern and capture the third partial physical patterns until the preset overall pattern area has been completed to complete the enrollment of the predetermined number of partial physical patterns. If the overall pattern capture procedure is completed, then the electronic apparatus notifies the user that the capturing operations of the biometrics characteristics have been completed.

Figure 12:
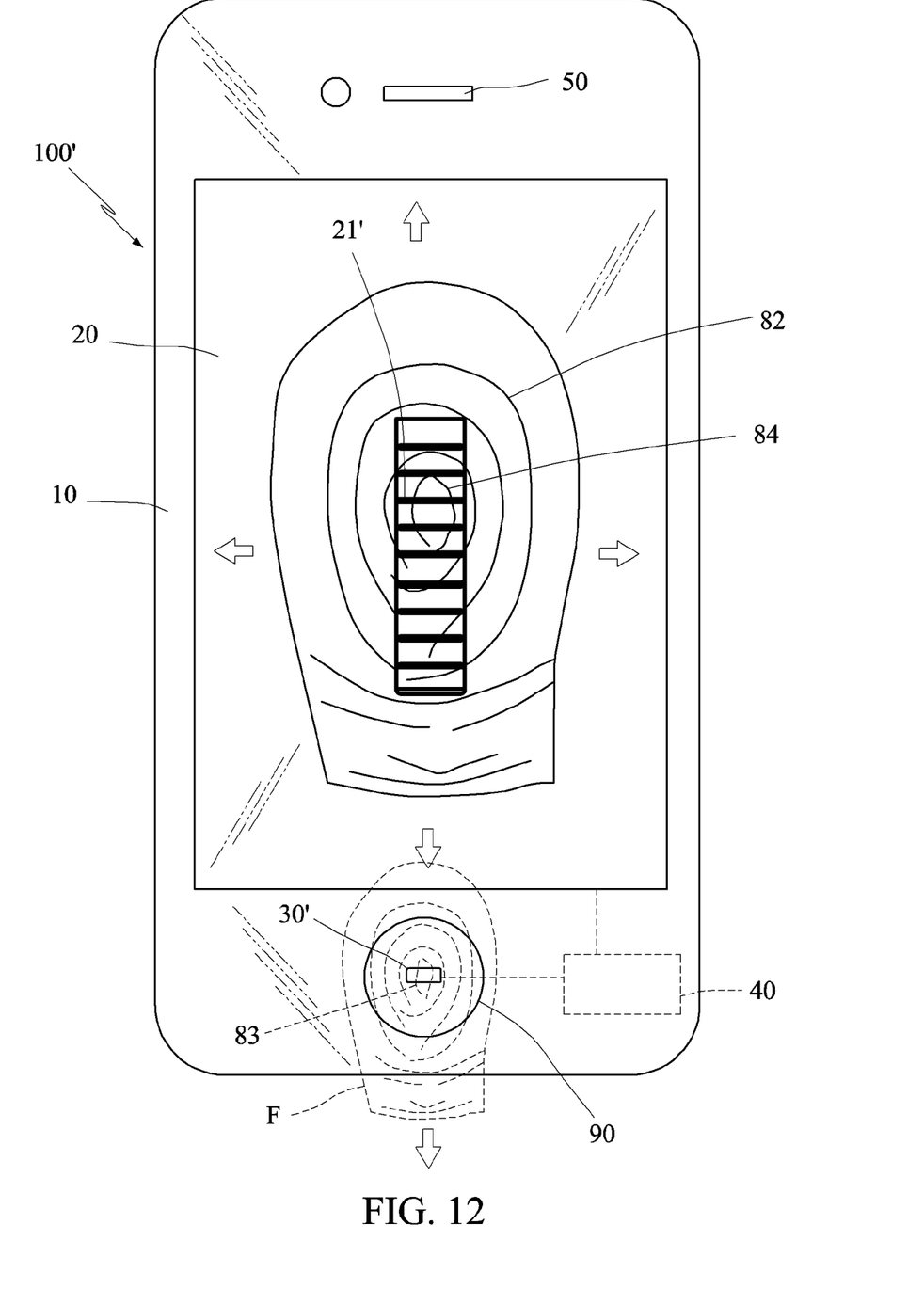
FIG. 12 is a schematic view showing an electronic apparatus according to a second embodiment of the invention.
Figure 13:
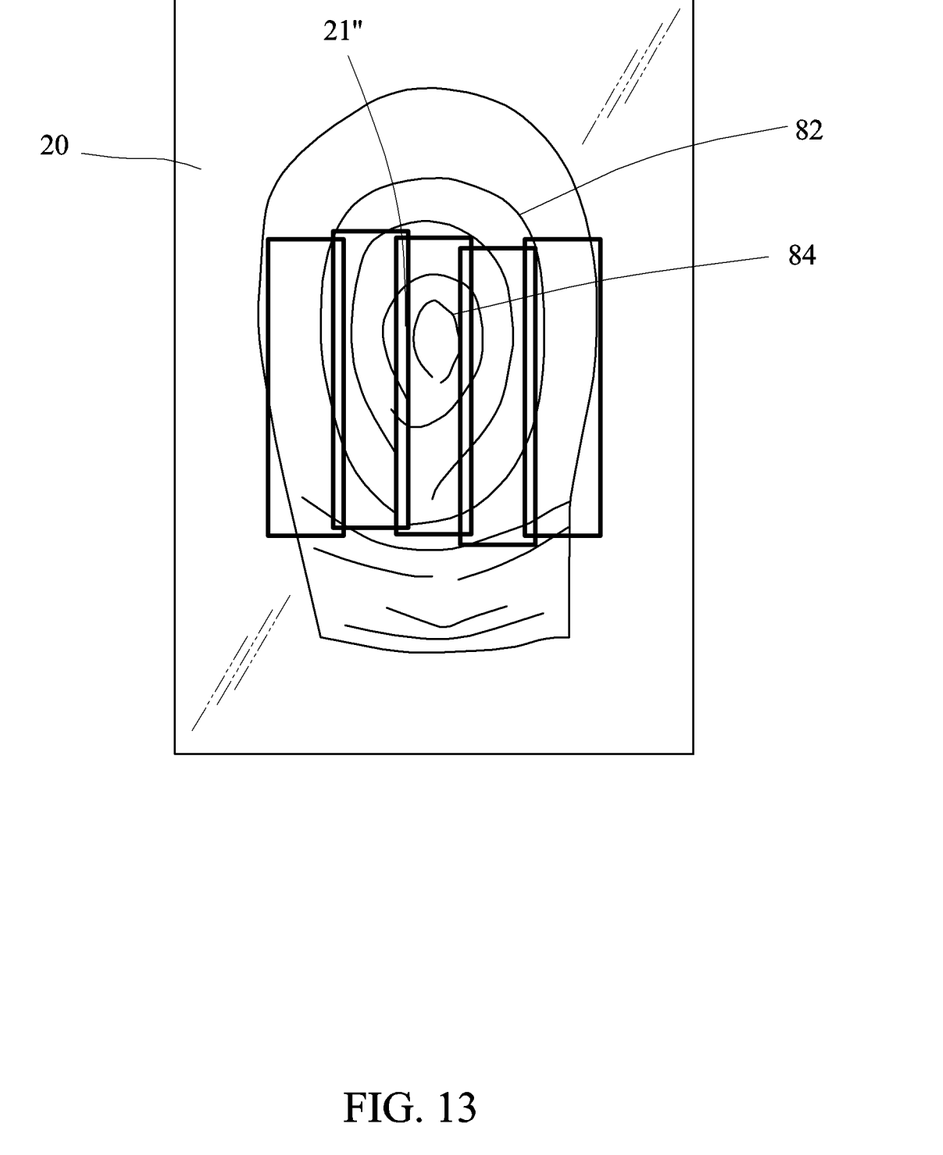
FIG. 13 is a schematic view showing a guiding state of the electronic apparatus according to the second embodiment of the invention.

FIG. 12 is a schematic view showing an electronic apparatus according to a second embodiment of the invention. FIG. 13 is a schematic view showing a guiding state of the electronic apparatus according to the second embodiment of the invention. As shown in FIGS. 12 and 13, this embodiment is similar to the first embodiment except that the first embodiment provides the area-type sensor for sensing a biometrics characteristic or pattern of the stationary finger placed on the sensor; while the second embodiment provides a sweep-type sensor for sensing a biometrics characteristic or pattern of the finger sweeping across the sensor. The width of the small-width biometrics sensor 30' is insufficient to sense the full-width pattern of the finger, so the electronic apparatus needs to guide the user to perform the longitudinal sweeping and transversal movement. It is possible to sweep the finger longitudinally twice (e.g., first sweeping and second sweeping) and then judge whether the longitudinal fragment image, obtained by the first sweeping, is disposed at middle or biased, and then the rectangular frames 21' or the large rectangular frame 21" combined by the rectangular frames 21' can be used to guide the user to sweep the left portion, middle portion or right portion of the finger. The overall flows are similar to those of the first embodiment, so detailed descriptions thereof will be omitted. Alternatively, the user may also transversally sweep the finger with the longitudinal movement of the finger to complete the biometrics characteristic capturing operation. It is to be noted that the electronic apparatus of each embodiment may also guide the finger to sweep regularly or irregularly until the biometrics characteristic capturing processes are finished. The advantage of this embodiment is that the biometrics sensor may have the smaller area and thus the lower cost.

Figure 14:
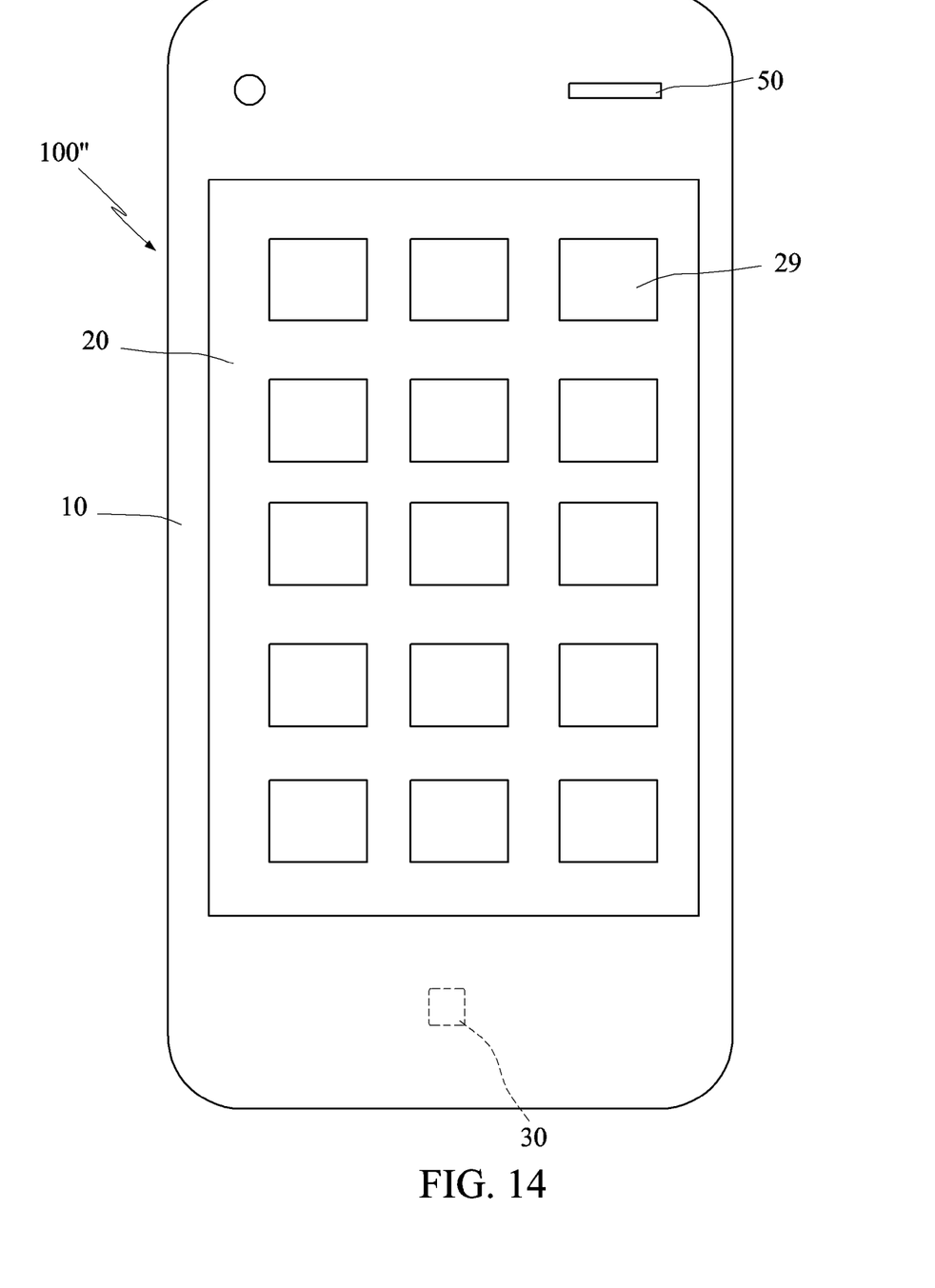
FIG. 14 is a schematic view showing an electronic apparatus according to a third embodiment of the invention.

FIG. 14 is a schematic view showing an electronic apparatus according to a third embodiment of the invention. As shown in FIG. 14, this embodiment is similar to the second embodiment except that the biometrics sensor of the electronic apparatus 100" is a hidden sensor, so the user cannot see the biometrics sensor 30 from the outlook, but the electronic apparatus 100" can interact with the user to guide the user to use the biometrics sensor 30. For example, when the user's finger approaches the biometrics sensor, the visual or acoustic triggering is provided to guide the user. The advantage is to make the electronic apparatus 100" have more simple or beautiful outlook.

According to the electronic apparatus with the segmented guiding function and the small-width biometrics sensor and the guiding method thereof, it is possible to utilize a small-area or small-width biometrics sensor to work in conjunction with the human-oriented segmented guiding so as to keep the beauty of the electronic apparatus and enable the user to perform the biometrics authentication to protect the data and the access right of the electronic apparatus.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An electronic apparatus, comprising:
a body;
a human-machine interface device disposed on the body, wherein the human-machine interface device comprises a display;
a small-width biometrics sensor disposed on the body; and
a processing module, which is disposed on the body, is electrically connected to the small-width biometrics sensor and the human-machine interface device, and cooperates with the human-machine interface device and the small-width biometrics sensor to utilize the human-machine interface device to guide different physical portions of a finger of a user to directly contact or approach the small-width biometrics sensor according to indications of the human-machine interface device, so that the small-width biometrics sensor senses the finger to capture partial physical patterns of the finger, wherein the processing module cooperates with the display to display a global virtual pattern on the display, to calculate a position of each of the partial physical patterns mapping to the global virtual pattern, and to display a partial virtual pattern corresponding to each of the partial physical patterns on the display to guide the user.

2. The electronic apparatus according to claim 1, wherein the partial virtual patterns are sequentially displayed on the display with different states to make the user obtain the positions of the partial physical patterns.

3. The electronic apparatus according to claim 1, wherein the partial physical patterns comprise first to N-th partial physical patterns according to a sensing order, the partial virtual patterns comprise first to N-th partial virtual patterns according to the sensing order, the processing module cooperates with the display to firstly display the first partial virtual pattern, and to display the second to N-th partial virtual patterns according to the position or positions of one or both of the first physical and partial virtual patterns to guide the user, wherein N is a positive integer greater than 1.

4. The electronic apparatus according to claim 1, wherein the processing module cooperates with the display to display one portion of the partial virtual patterns by way of filling-coloring or clearing-wiping according to a position where the user places the finger to correspondingly show one portion of the sensed partial physical patterns.

5. The electronic apparatus according to claim 1, wherein the human-machine interface device comprises a sound triggering module, which is disposed on the body and electrically connected to the processing module, and outputs directional sound commands to guide movement of the finger of the user.

6. The electronic apparatus according to claim 1, further comprising a physical indicating pattern, which is formed on the body and adjacent to the small-width biometrics sensor, and provides direction indicating guides.

7. The electronic apparatus according to claim 6, wherein the processing module cooperates with the display to display a virtual indicating pattern corresponding to the physical indicating pattern on the display to achieve a guiding function.

8. The electronic apparatus according to claim 6, wherein the processing module judges the positions of the partial physical patterns according to a curvature vector, a density and a curvature of a texture of each of the partial physical patterns.

9. The electronic apparatus according to claim 1, wherein the processing module forms a global physical pattern from the partial physical patterns by way of logic assembling, wherein a pattern area of the global physical pattern is greater than a sensing area of the small-width biometrics sensor.

10. The electronic apparatus according to claim 1, wherein the small-width biometrics sensor is an area-type sensor for sensing a biometrics characteristic or pattern of the stationary finger placed on the area-type sensor.

11. The electronic apparatus according to claim 1, wherein the small-width biometrics sensor is a sweep-type sensor for sensing a biometrics characteristic or pattern of the finger sweeping across the sweep-type sensor.

12. An electronic apparatus, comprising:
a processing module;
a human-machine interface device electrically connected to the processing module, wherein the human-machine interface device comprises a display; and
a small-width biometrics sensor electrically connected to the processing module, wherein the processing module executes a positioning algorithm and cooperates with the human-machine interface device to utilize the human-machine interface device to provide a human-machine interface, the human-machine interface comprises a virtual fingerprint image to provide an initial intelligent guide to guide different physical portions of a finger of a user to directly contact or approach the small-width biometrics sensor, so that the small-width biometrics sensor senses the finger to capture partial physical patterns of the finger, wherein the processing module executes the positioning algorithm to judge a geometric position of a first one of the captured partial physical patterns corresponding to a global physical pattern of the finger, and correspondingly maps the geometric position to the virtual fingerprint image of the display to establish a virtual geometric position on the virtual fingerprint image to display an enrolled first partial virtual pattern.

13. The electronic apparatus according to claim 12, wherein after the processing module executes the positioning algorithm and then makes a geometric position judgement, a subsequent intelligent guide is enabled to indirectly or directly guide the user to move the finger to a predetermined position in conjunction with indications of the human-machine interface.

14. A guiding method of an electronic apparatus with a segmented guiding function, the electronic apparatus comprising a human-machine interface device and a biometrics sensor, and the human-machine interface device comprising a display, the guiding method comprising the steps of:
displaying a global virtual pattern on the display;
utilizing the biometrics sensor to capture a first partial physical pattern of a finger;
utilizing a positioning algorithm to calculate a geometric position of the finger according to the first partial physical pattern;
establishing a virtual geometric position and cooperating with the display to display the global virtual pattern and a first partial virtual pattern corresponding to the partial physical patterns; and
performing a subsequent intelligent guide according to the geometric position of the finger to utilize the biometrics sensor to capture a second partial physical pattern of the finger.

15. The guiding method according to claim 14, further comprising, before the first partial physical pattern is captured:
utilizing the positioning algorithm and the human-machine interface device to perform an initial intelligent guide to guide the finger to directly contact or approach the biometrics sensor.

16. The guiding method according to claim 14, further comprising, after the second partial physical pattern is captured:
judging whether the second partial physical pattern is valid according to the positioning algorithm and the subsequent intelligent guide.

* * * * *